(12) United States Patent
Alexis et al.

(10) Patent No.: US 11,471,812 B2
(45) Date of Patent: Oct. 18, 2022

(54) MOBILE FILTER SYSTEM AND METHOD

(71) Applicant: GM GLOBAL TECHNOLOGY OPERATIONS LLC, Detroit, MI (US)

(72) Inventors: Rolf D. Alexis, Saline, MI (US); Mahesh V. Patel, Sterling Heights, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 288 days.

(21) Appl. No.: 16/794,832

(22) Filed: Feb. 19, 2020

(65) Prior Publication Data
US 2021/0252444 A1 Aug. 19, 2021

(51) Int. Cl.
*B01D 46/42* (2006.01)
*B01D 46/00* (2022.01)
*B01D 46/44* (2006.01)
*B01D 46/84* (2022.01)

(52) U.S. Cl.
CPC ..... *B01D 46/4227* (2013.01); *B01D 46/0002* (2013.01); *B01D 46/446* (2013.01); *B01D 46/448* (2013.01); *B01D 46/84* (2022.01); *B01D 2265/00* (2013.01)

(58) Field of Classification Search
CPC ............ B01D 46/0002; B01D 46/4227; B01D 46/446; B01D 46/448; B01D 46/84; B01D 2265/00; F23J 15/00; F23J 15/02; F02B 63/00; F02B 63/04; F02B 63/047; F02B 63/048; F01N 3/08; F01N 3/10; F01N 3/0807; F01N 3/0821
See application file for complete search history.

(56) References Cited

U.S. PATENT DOCUMENTS

| | | | | |
|---|---|---|---|---|
| 5,073,259 | A * | 12/1991 | Solimar | B65G 53/60 55/467 |
| 5,425,316 | A * | 6/1995 | Malone | F23G 5/006 110/190 |
| 6,022,389 | A * | 2/2000 | Vross | B01D 46/00 55/467 |
| 9,089,806 | B2 * | 7/2015 | Powell | B01D 46/42 |
| 10,422,260 | B2 * | 9/2019 | Tonsich | B01D 53/685 |
| 2004/0047776 | A1 * | 3/2004 | Thomsen | B01D 46/0091 422/186.3 |
| 2008/0184889 | A1 * | 8/2008 | Zimmerman | B01D 46/02 95/286 |
| 2011/0042964 | A1 * | 2/2011 | Kitch | F02D 29/06 290/1 B |

* cited by examiner

*Primary Examiner* — Gabriel E Gitman
(74) *Attorney, Agent, or Firm* — Lorenz & Kopf LLP

(57) ABSTRACT

Systems and methods are provided for mobile treatment of an exhaust stream. A treatment assembly including an inlet. A coupling is configured to releasably couple the inlet with an outlet of a stationary processing facility that produces an exhaust stream. The treatment assembly receives the exhaust stream in an input stream, treats at least one constituent of the input stream, and produces a treated exhaust. The treatment assembly is decouplable from the stationary processing facility and transportable to various locations.

20 Claims, 8 Drawing Sheets

MOBILE FILTER SYSTEM AND METHOD

INTRODUCTION

The present disclosure generally relates to the treatment of exhaust flow streams, and more particularly relates to treatment systems that are mobile for relocation to a variety of facilities where treatment needs arise.

A variety of operations in manufacturing, processing and general industry involve emitting flow streams in a gas or liquid state that may contain constituents that are desirably removed prior to release. Some of these emitting source facilities include emission controls systems that remove certain constituents on an ongoing basis. Other sources facilities may typically operate without a need for ongoing emission control systems and may exhaust directly to the atmosphere. Any of these sources may operate only intermittently under conditions that generate by-products where the removal of certain constituents from the exhaust stream is desired. One example of a system that intermittently operates under different conditions is a regenerative thermal oxidizer (RTO). An RTO includes a media bed that, over time, accumulates benign materials collected from the facility's exhaust stream. When the accumulation is in need of removal, a bake-out may be used where the temperature of the RTO bed is raised to a point that incinerates the accumulated materials. By-products of the bake-out are typically produced only occasionally and are generally exhausted to the atmosphere. Capture of these by-products may be desirable in certain circumstances, such as to reduce opacity.

Accordingly, it is desirable to provide systems and methods that efficiently capture certain constituents from exhaust streams on an intermittent basis. Furthermore, other desirable features and characteristics of the present invention will become apparent from the subsequent detailed description and the appended claims, taken in conjunction with the accompanying drawings and the foregoing technical field and introduction.

SUMMARY

Systems and methods are provided for mobile treatment of an exhaust stream. In a number of embodiments, a treatment assembly includes an inlet. A coupling is configured to releasably couple the inlet with an outlet of a stationary processing facility that produces an exhaust stream. The treatment assembly receives the exhaust stream as an input stream, removes at least one constituent from the input stream, and produces a treated exhaust. The treatment assembly is decouplable from the stationary processing facility and transportable to various locations.

In additional embodiments, the treatment assembly is disposed on a vehicle with wheels.

In additional embodiments, the treatment assembly includes a treatment house and a fan that induces the input stream to flow through the treatment house.

In additional embodiments, the treatment assembly includes a fresh air damper disposed between the inlet and the treatment house. The fresh air damper is configured to admit ambient air into the treatment house.

In additional embodiments, the treatment assembly includes a generator configured to power the fan.

In additional embodiments, the treatment facility includes a controller that monitors a temperature in the treatment house and maintains the temperature at a level below a maximum temperature by operating the fresh air damper.

In additional embodiments, the treatment assembly includes a fan that induces a flow of the exhaust stream through the inlet as the input stream. A treatment house is disposed between the inlet and the fan. A motor is coupled with the fan. A control system operates the treatment assembly. A generator is coupled with the motor and with the control system and the treatment assembly is self-powered by the generator.

In additional embodiments, the control system includes a controller that monitors operation of the motor and the generator, and displays any faults in the monitored operations through an operator interface.

In additional embodiments, the stationary processing facility includes a stack configured to exhaust to atmosphere, wherein the stack includes the outlet.

In additional embodiments, the treatment assembly includes a pressure sensor and a controller that receives an input from the pressure sensor and determines, from the input, a flow through the treatment assembly.

In a number of additional embodiments, a method includes assembling a treatment assembly that includes an inlet. The inlet is releasably coupled with an outlet of a stationary processing facility that produces an exhaust stream. The treatment assembly receives the exhaust stream in an input stream. The treatment assembly treats at least one constituent of the input stream and produces a treated exhaust. The treatment assembly is decoupled from the stationary processing facility and transported to various locations.

In additional embodiments, the treatment assembly is contained on a vehicle with wheels.

In additional embodiments, a fan in the treatment assembly induces the input stream to flow through a treatment house.

In additional embodiments, a fresh air damper disposed between the inlet and the treatment house admits ambient air into the treatment house.

In additional embodiments, the fan is powered by a generator in the treatment assembly.

In additional embodiments, a controller in the treatment assembly monitors a temperature in the treatment house and maintains the temperature at a level below a maximum temperature by operating the fresh air damper.

In additional embodiments, a fan in the treatment assembly induces a flow of the exhaust stream through the inlet as the input stream. A treatment house is assembled between the inlet and the fan. A motor is coupled with the fan. A control system operates the treatment assembly. A generator in the treatment assembly is coupled with the motor and with the control system and self-powers the treatment assembly.

In additional embodiments, a controller monitors operation of the motor and of the generator, and displays faults in the monitored operation through an operator interface.

In additional embodiments, a controller receives input and from at least one pressure sensor and determines, using the input, a flow through the treatment assembly.

In a number of other embodiments, a system includes a treatment house disposed on a vehicle. An inlet is connected with the treatment house and is configured to releasable couple with a source of an exhaust stream. A fan is disposed on the vehicle and induces the exhaust stream to flow through the inlet as an inlet stream directed into and through the treatment house. The treatment house is configured to treat at least one constituent of the input stream and produce a treated exhaust discharged from the fan. The vehicle with the treatment house and the fan is configured for transport to, and operation at, various locations.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
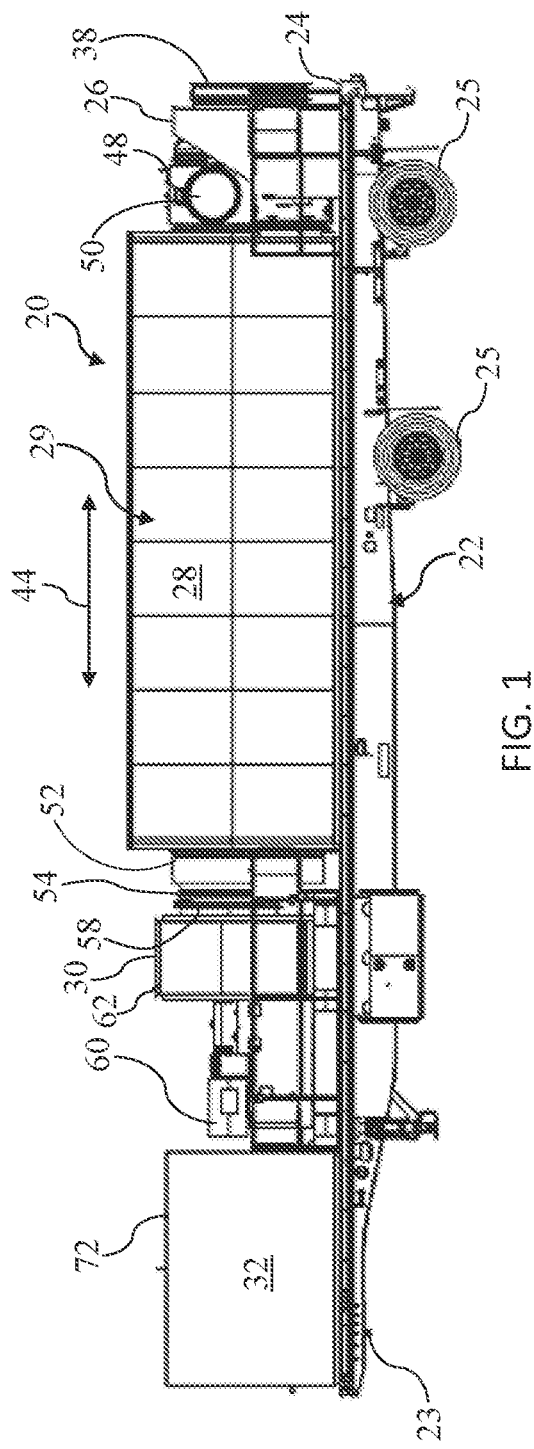
FIG. 1 illustrates a mobile treatment system in side elevation view, in accordance with various embodiments.

The following detailed description discloses embodiments that are examples that are not intended to limit the application and its uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of steering systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As described herein, disclosed mobile treatment system and method embodiments provide a timely and efficient response to intermittent exhaust treatment needs. In a number of embodiments, a treatment assembly is disposed on a transportable trailer and in general, includes a powered fan to induce flow through a treatment device to capture desired constituents from an exhaust stream. The treatment assembly is mobile for use at a desired location after being connected with a stationary processing facility, and is configured to be readily decoupled and transported to other locations for use on exhaust systems of other processing facilities. In exemplary embodiments described herein, the mobile treatment assembly is employed during bake-out of a RTO, but the disclosure is not limited to use with RTOs and may be employed wherever exhaust constituent capture is needed, including on a quick response and/or temporary basis. In addition, the disclosure may describe embodiments as involving an exhaust gas stream, but the disclosure is not limited to the treatment of gas streams and is applicable to the treatment of exhaust liquid streams as well.

Referring to FIG. 1, mobile treatment system with a treatment assembly 20 is shown mounted on a vehicle, which in this embodiment is a trailer 22. The trailer 22 is configured for operation over typical public roadways and includes a number of wheels 25 as needed to carry the load, which varies depending on the size and capacity of the treatment assembly 20. In the current embodiment, the trailer 22 is a standard semi-trailer unit with a kingpin 23 for mating with a semi-tractor (not shown), and the treatment assembly 20 is configured to fit thereon. While the trailer 22 is configured for connection with a tow vehicle (not shown) for transport, in some embodiments the treatment assembly 20 may be mounted on a self-propelled vehicle such as a flatbed truck. In the current embodiment, the treatment assembly 20 is contained on one vehicle. It should be understood that for large capacity systems more than one vehicle may be used to carry components of the treatment assembly 20, which may be configured for interconnection at their point of use. In some embodiments, the treatment assembly 20 may be permanently fixed to the trailer 22. In other embodiments, the treatment assembly 20 may be assembled as a unit that is removeable from the trailer 22. For example, the treatment assembly 20 may be assembled on a base 24 that is fixed to the trailer 22 in a permanent or in a removeable configuration, such as by bolts or clamps (not shown). When removeable, the treatment assembly 20 may be disconnected and moved separately from the trailer 22, such as for movement by crane or airlift. In such cases, the treatment assembly 20 may be employed above ground level, such as on top of a building. In still other embodiments, the treatment assembly 20 may be assembled on the base 24 and moved by rail, air, or otherwise without the use of a trailer 22 type vehicle.

Figure 2:
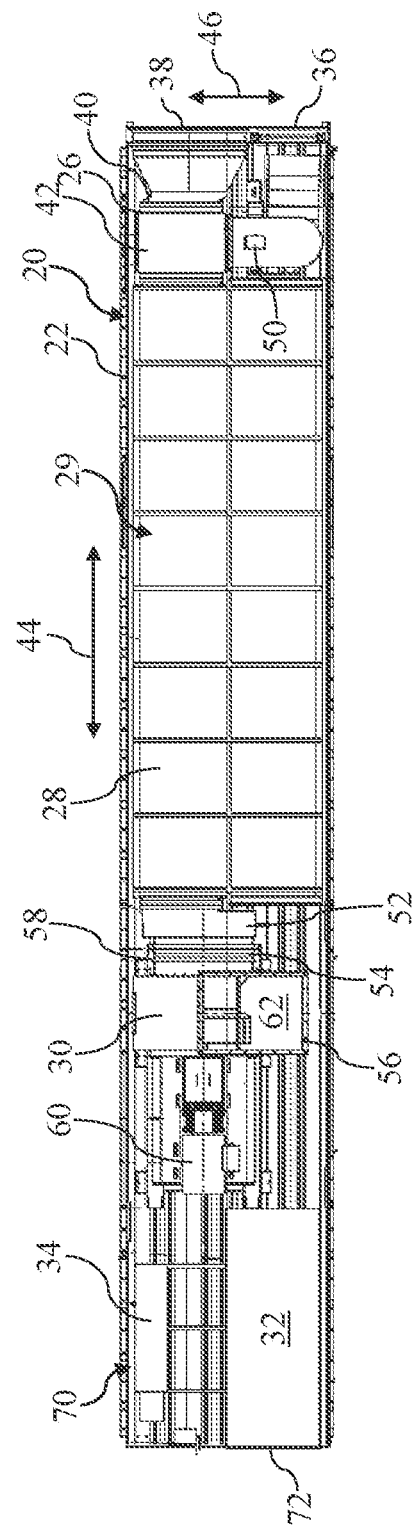
FIG. 2 is a top view of the mobile treatment system of FIG. 1, in accordance with various embodiments.
Figure 3:
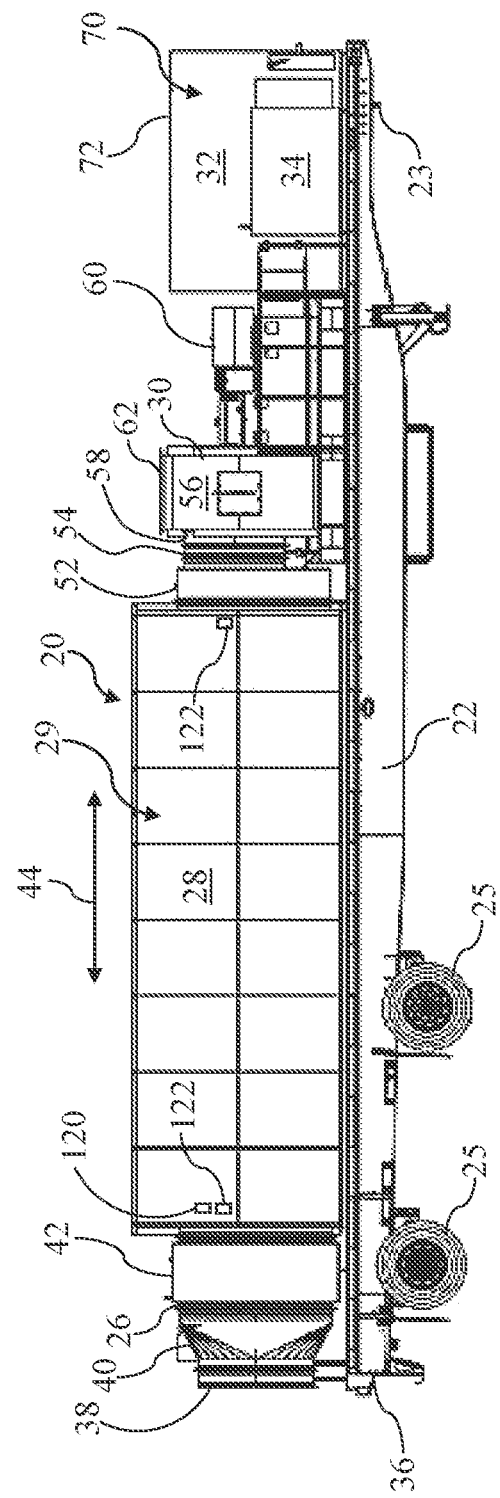
FIG. 3 is another side view of the mobile treatment system of FIG. 1, in accordance with various embodiments.

Referring to FIGS. 2 and 3 along with FIG. 1, the treatment assembly 20 generally includes an inlet connector and duct assembly 26, a treatment house 28, a fan assembly 30, a generator 32, and a control panel 34. The inlet connector and duct assembly 26 is positioned at the rear 36 of the trailer 22 and includes an inlet 38 that is disposed horizontally in line with the rear 36 of the trailer 22 for presentation at a location that is readily mated with and releasably connected to an exhaust outlet of a stationary processing facility as further described below. In the current embodiment, the inlet 38 is configured as a round duct connector for connecting with the intended mating exhaust outlet at a point of use. In a number of embodiments, adapters (not shown) may be used to connect with various sized and shaped exhaust outlets. The inlet connector and duct assembly 26 includes a round to square transition 40 and a square duct section 42 that leads to the treatment house 28.

The treatment house 28 extends in a longitudinal direction 44 along a substantial portion of the trailer 22 and extends in a transverse direction 46 across substantially all of the width of the trailer 22. The treatment house 28 is configured to capture the constituents targeted for capture from the source exhaust stream that it is employed to treat. In the current embodiment the treatment house 28 includes one or more filters that include a filter media 29 made of fiberglass and/or metal for handling elevated exhaust gas stream temperatures. The source exhaust stream enters as at least part of an input stream that is directed through the filter media 29 and particulate is collected on the filter media 29. In the current embodiment, the target constituent is particulate in the source exhaust stream, which is removed by the filter media. The filter media 29 may be disposable when spent, or may be regenerative or cleanable. In other embodiments, another type of collection system is employed in the treatment house 28 as appropriate for capturing different target constituents.

The treatment house 28 may have a maximum operating temperature determined by the type of media used, and the treatment assembly 20 may be controlled to maintain the fluid stream flowing through the treatment house 28 below the maximum operating temperature as further descried below. Control of temperature in the treatment house 28 is accomplished by including a fresh air damper 48 that is configured to admit a variable amount of fresh air into the treatment house 28, such as at the inlet connector and duct assembly 26. In the current embodiment, the fresh air damper 48 is an approximately 61 centimeter (24 inch) diameter flap that pivots under operation of an electric actuator 50. The fresh air damper 24 is modulated and may be closed, or may be opened a variable amount.

The fan assembly 30 is configured to draw the input stream into and through the treatment house 28, and is mounted on the trailer 22 forward of the treatment house 28. The fan assembly 30 includes a square-to-round duct transition 52 leading from the treatment house 28, a flex connector 54, a fan 56 with a round inlet 58 connected with the flex connector 54, and a motor 60. In the current embodiment the fan is of a centrifugal type with the outlet 62 disposed on top and with the inlet 58 disposed on the side. As such, the discharge from the treatment assembly 20 through the outlet 62 is directed upward. In other embodiments, another type of pump or fan may be used. In a number of embodiments, the outlet 62 may include a foldable/extendable vent outlet to extend the discharge upward. The fan 56 is sized to induce a desired of flow from the connected exhaust source and through the inlet connector and inlet duct assembly 26 as an inlet stream. The motor 60 is coupled with the fan 56 and in this embodiment is an electric motor with variable frequency drive for speed/torque control.

The generator system 32 supplies power for the treatment assembly 20 including for the motor 60, the actuator 50, the electrical control system 70, and other devices, various aspects of which are housed in the control panel 34. As a result of power supplied by the generator system 32, the treatment assembly 20 is self-contained with regard to operation of the treatment system. The generator system 32 includes a diesel internal combustion engine (not shown) coupled with at least one electrical generator contained as a genset in housing 72. In other embodiments other types of generators may be used to supply the power requirements of the treatment assembly 20.

Figure 4:
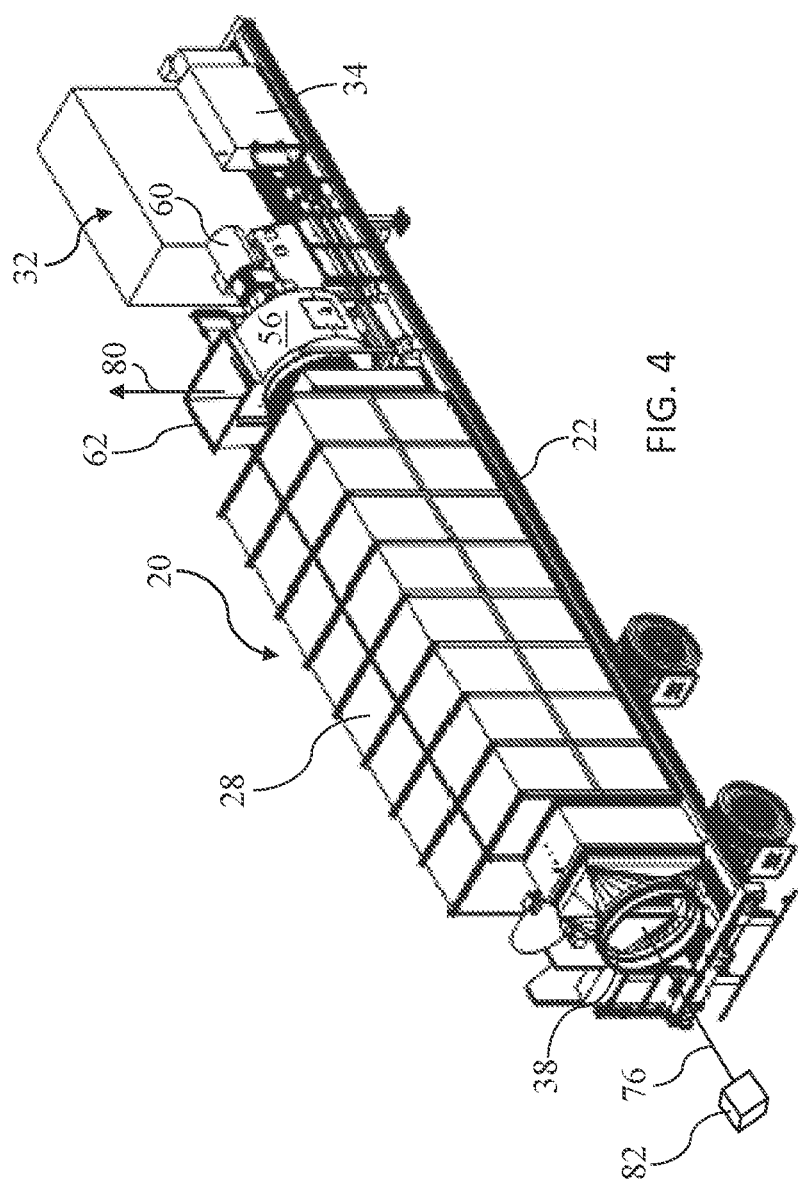
FIG. 4 is an isometric view of the mobile treatment system of FIG. 1, in accordance with various embodiments.

Referring to FIG. 4, the input stream 76 induced from a fluid exhaust stream generated by the associated processing facility 82 enters the treatment assembly 20 through the inlet 38. The fan 56 draws the input stream 76 through the inlet 38, and the treatment house 28, where constituents are removed by filtering in this embodiment. The fan 56 delivers a treated exhaust 80 from the outlet 62. In the current embodiment, the treatment house 28 is configured to remove particulate from the input stream 76 to reduce opacity of the treated exhaust 80 and as such it includes filters. In other embodiments, the treatment house 28 may be configured to remove additional or other constituents from the induced input stream 76 as needed, and may include treatment approaches other than filtering, including those that change or convert constituents rather than removing them.

Figure 5:
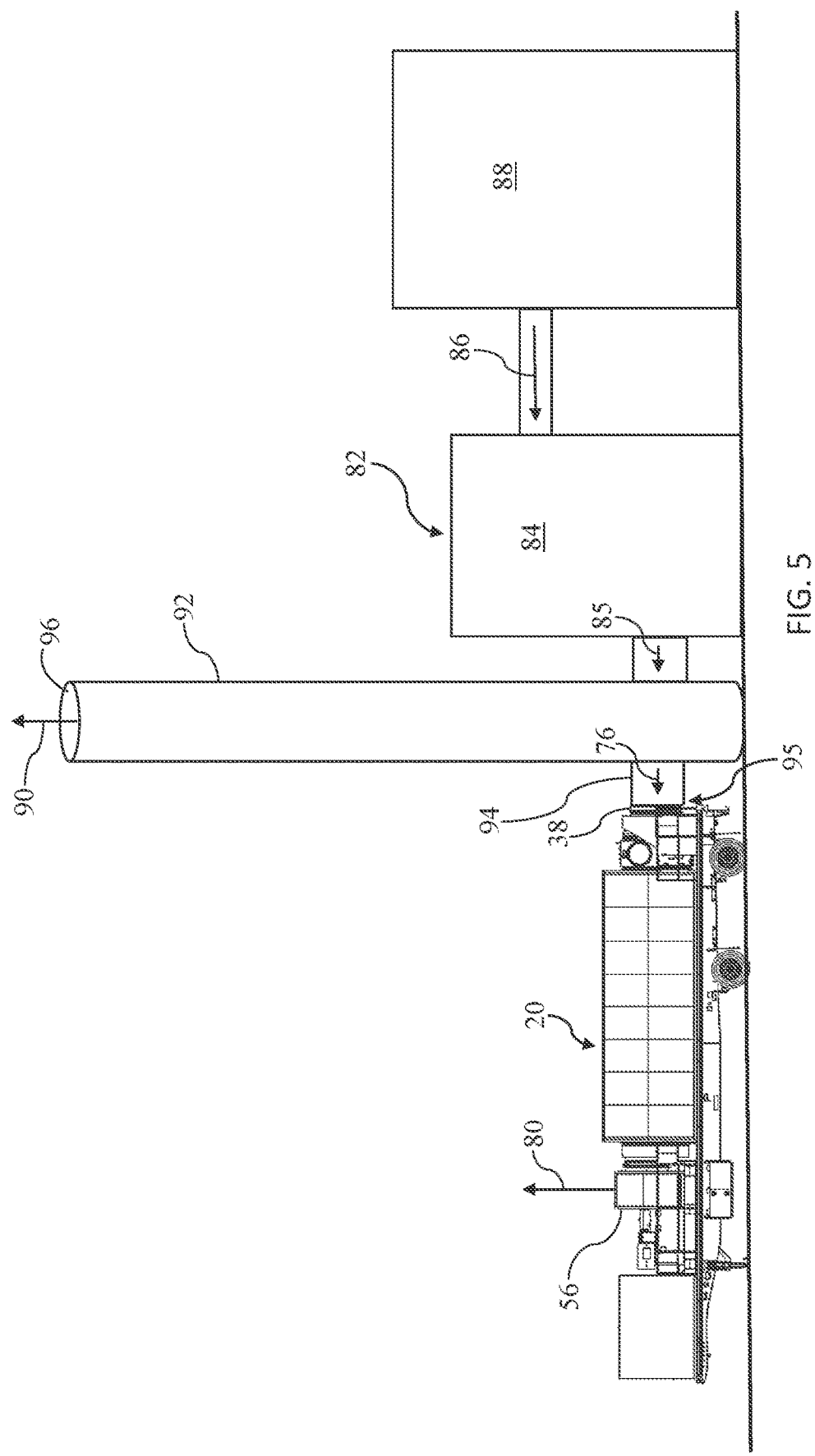
FIG. 5 is a schematic view of the mobile treatment system of FIG. 1 coupled with a stationary processing facility, in accordance with various embodiments.

As shown in FIG. 5, the inlet 38 of the treatment assembly 20 is coupled to a stationary processing facility 82 by a coupling 95. The processing facility 82 is provided with a RTO 84 that receives a source exhaust stream 86 from a source 88. The source 88 may be any operation or activity that generates a source exhaust stream 86 for which treatment is desired. The source 88 may include one or a variety of multiple activities such as a paint shop, a foundry, a dynamometer test cell, or others. Treatment includes removing and/or converting and/or otherwise changing at least one constituent of the source exhaust stream 86. In one mode of operation of the processing facility 82, the source exhaust stream 86 is directed through the RTO 84 where constituents are treated and the resulting treated stream 90 is expelled to the atmosphere through the top 96 of a stack 92. In the current embodiment, operation of the RTO 84 to treat the source exhaust stream 86, produce the treated stream 90 and expel it through the top 96 of the stack 92, is separate from operation of the treatment assembly 20 to treat the by-products of a bake-out of the RTO 84. In other embodiments, the treatment assembly 20 may operate in conjunction with the processing facility 82 as a secondary treatment device, or may be operated as a primary treatment device to treat the source exhaust stream 86.

In operation, treatment assembly 20 is coupled to the stationary processing facility 82 at an outlet that serves as an access point. In the current embodiment, the inlet 38 is connected by a coupling 95 with a conduit 94 that serves as the outlet. In this embodiment, the conduit 94 is a duct section connected with the stack 92 and also serves as a cleanout access point when not used by the treatment assembly 20. In various embodiments, the conduit 94 is any structure that serves to channel flow from the processing facility 82 and to which the inlet 38 of the treatment assembly 20 is adapted to connect. The conduit 94 may include a door or other closure (not shown) to close the opening into the stack 92 when not used by the treatment assembly 20. When the fan 56 is operated, flow is drawn from the RTO 84 through the stack 92, the conduit 94, and into the treatment assembly 20. During operation, the fan 56 generates sufficient negative pressure to prevent gases from exiting the top 96 of the stack 92.

Figure 6:
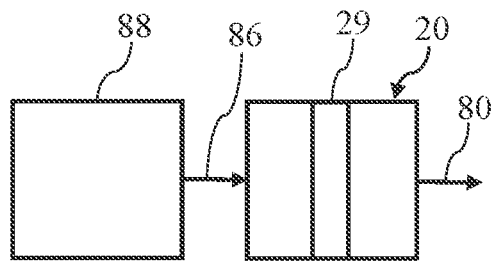
FIG. 6 is a diagram of a process in which the mobile treatment system of FIG. 1 treats a processing facility exhaust stream, in accordance with various embodiments.
Figure 7:
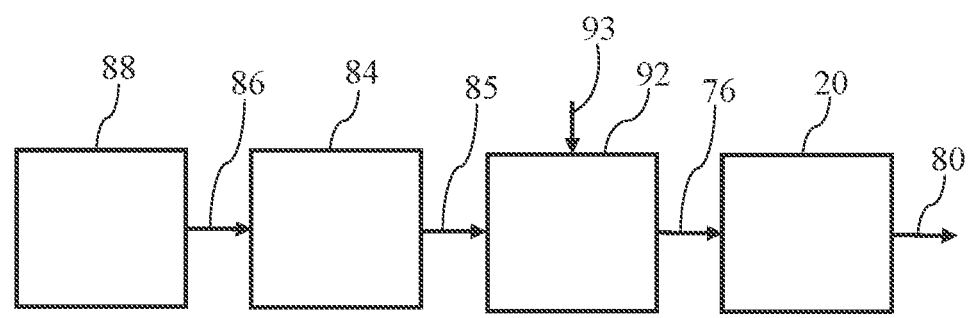
FIG. 7 is a diagram of a process in which the mobile treatment system of FIG. 1 treats a pretreated exhaust stream, in accordance with various embodiments.
Figure 8:
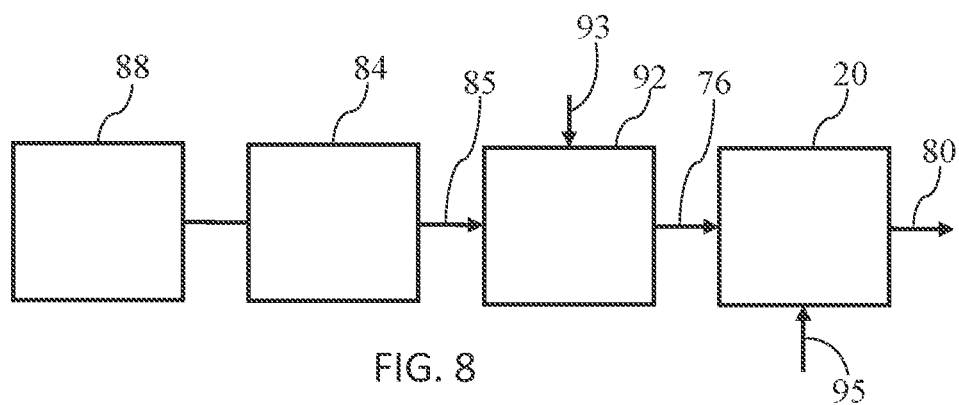
FIG. 8 is a diagram of a process in which the mobile treatment system of FIG. 1 is configured to treat a RTO exhaust stream, in accordance with various embodiments.

Illustrated in FIGS. 6-8 are process flow embodiments of various applications of the treatment assembly 20. As shown in FIG. 6, the treatment assembly 20 is coupled to receive the source exhaust stream 86 from the source 88 as an input stream. The treatment assembly 20 effects treatment of the source exhaust stream 86 to remove or change at least one constituent thereof and produces a treated exhaust 80 with the target constituent(s) removed or changed. For example, the treatment assembly 20 may contain a filter media 29 that removes particulate from the input stream. In other embodiments, the treatment assembly 20 may contain a treatment system other than a filter that employs other methods to from the constituents. The current embodiment may be employed as a rapid response in situations where a desire for treatment arises. The source exhaust stream 86 may be one where treatment is typically not needed.

As shown in FIG. 7, the treatment assembly 20 is employed as a secondary treatment system. The source 88 produces an input gas stream that is directed through the RTO 84 as a primary treatment system. From the RTO 84 the resulting process exhaust stream 85 is directed into the stack 92 from which the treatment assembly draws its input stream 76. The input stream 76 includes all of the process exhaust stream 85 and may include some air 93 drawn in through the stack 92. The treatment assembly 20 treats the input stream 76 and produces the treated exhaust 80. The current embodiment may also be employed as a response in situations where a desire for treatment arises. The source exhaust stream 86 may be one where treatment is typically provided but where supplementation is desired.

As illustrated in FIG. 8, the source 88 is not in operation and produces no output. The RTO 84 is operated in a mode for which treatment by the treatment assembly 20 as a primary treatment process is desired. From the RTO 84 the resulting process exhaust stream 85 is directed into the stack 92 from which the treatment assembly 20 draws its input stream 76. The input stream 76 includes all of the process exhaust stream 85 and may include some air 93 drawn in through the stack 92. The treatment assembly treats the input stream 76 and produces the treated exhaust 80. The treatment assembly 20 also draws in air 95 as needed, such as to modulate temperature, which may also be used in the embodiments of FIGS. 6 and 7. The current embodiment may be employed as a response in situations where a desire for treatment arises. The source exhaust stream 86 may be one where treatment is typically provided but where a desire for use of the treatment assembly 20 arises, such as due to a scheduled intermittent mode of operation.

Figure 9:
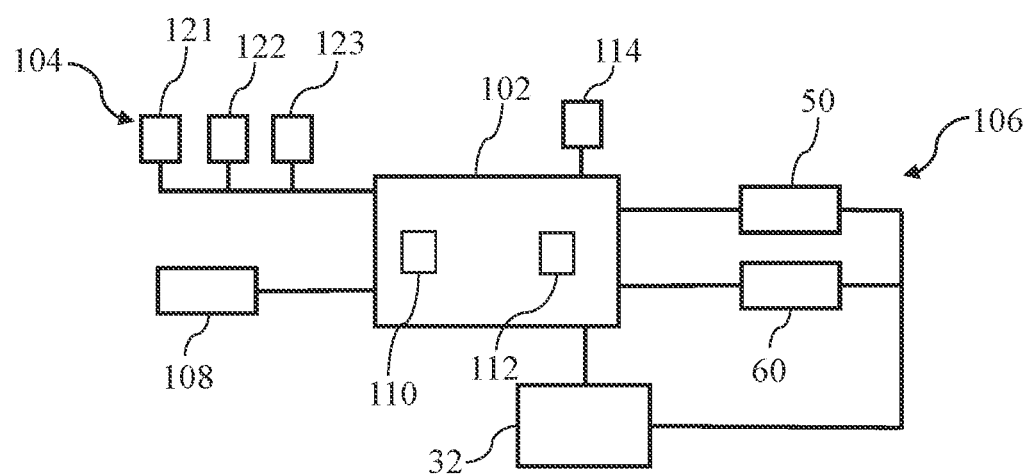
FIG. 9 is a schematic diagram of a control system for use with the mobile treatment system of FIG. 1, in accordance with various embodiments.

General aspects of the control system 70 for the treatment assembly 20 are depicted in FIG. 9. The control system 70 generally includes at least one controller 102, a sensor suite 104, actuators 106, an operator interface 108, and the generator system 32. The operator interface 108 may take a variety of forms to deliver information to the operator and to receive commands, such as a screen and keyboard, a touchscreen, or other form. The controller 102 may receive various signals from the sensor suite 104 and the operator interface 108, may send control signals to the actuators 106 and the generator system 32, and may interface with the other devices, including other controllers. For example in some embodiments, the controller 102 may couple with the processing facility 82 for coordinated operation. In a number of embodiments, other sensors that sense observable conditions related to the treatment assembly 20 and/or the processing facility 82 may be included. The controller 102 is communicatively coupled to receive input signals from the various sensors, which are configured to generate the signals in proportion to various physical parameters. In general, the controller 102 may use the sensed values to generate output signals for delivery to various controlled devices including the actuators 106. The controller 102 may comprise any number of electronic control modules and is configured to receive information from various sources, process that information, and provide control signals/commands based thereon to effect outcomes such as operation of the actuators 106. In the depicted embodiment, the controller 102 includes a processor 110, a memory device 112, and may include or may be coupled with a storage device 114. The processor 110 performs the computation and control functions of the controller 102, and may comprise any type of processor or multiple processors, single integrated circuits such as a microprocessor, or any suitable number of integrated circuit devices and/or circuit boards working in cooperation to accomplish the functions of a processing unit. During operation, the processor 110 executes one or more programs and may use data, each of which may be contained within the storage device 114 and as such, the processor 110 controls the general operation of the controller 102 in executing certain steps such as of the processes described herein, including below in connection with FIG. 10.

The memory device 112 may be any type of suitable memory. In the depicted embodiment, the memory device 112 may store the above-referenced programs along with one or more stored values of the data such as for short-term data access. The storage device 114 stores data, such as for long-term data access for use in automatically controlling the treatment assembly 20 and its related systems. The storage device 114 may be any suitable type of storage apparatus. In one exemplary embodiment, the storage device 114 comprises a source from which the memory device 112 receives the programs that execute one or more embodiments of one or more processes of the present disclosure, such as the steps of the process (and any sub-processes thereof) described further herein, including below in connection with FIG. 10. In another exemplary embodiment, the programs may be directly stored in and/or otherwise accessed by the memory device 112. The programs represent executable instructions, used by the electronic controller 102 in processing information and in controlling the treatment assembly 20 and related systems. The instructions may include one or more separate programs, each of which comprises an ordered listing of executable instructions for implementing logical functions. The instructions, when executed by the processor 110 support the receipt and processing of signals such as from the various sensors, and the performance of logic, calculations, methods and/or algorithms for automatically controlling the components and systems of the treatment assembly 20. The processor 110 may generate control signals for automatic control based on the logic, calculations, methods, and/or algorithms. As will be appreciated, the data storage device 114 may be part of the controller 102, separate from the controller 102, part of one or more other controllers, or part of multiple systems. The memory device 112 and the data storage device 114 work together with the processor 110 to access and use the programs and the data. While the components are depicted as being part of the same system, it will be appreciated that in certain embodiments, these features may comprise multiple systems. For example, the generator system 32 may have a separate controller.

The sensor suite 104 includes a number of sensors including at least one temperature sensor 121, including for measuring temperature of the input stream 76 entering the treatment house 28. The temperature of the entering input stream 76 is maintained below a maximum temperature acceptable for the filter media 29. The temperature is controlled through modulation of the fresh air damper 48 under operation of its actuator 50 by the controller 102. The sensor suite 104 also includes at least one pressure sensor 122 for determining the pressure drop induced by the fan 56, which may be used to monitor filter loading. For example, one pressure sensor 122 may be disposed at the inlet end of the treatment house 28 on an upstream side of the filter media 29 and another pressure sensor may be disposed at the outlet end of the treatment house 28 on a downstream side of the filter media 29. Flow through the filter house 28 may be determined from the pressure sensor readings. By monitoring the pressure sensor(s) 122, the controller 102 determines whether flow has dropped below an acceptable level. Speed and/or torque of the motor 60 may be varied via the variable frequency drive to maintain a desired flow level. Various other sensors 123 may be included in the sensor suite 104, such as to monitor the generator system 32, the motor 60, position of the fresh air damper 48, quality of the treated exhaust 80 and/or other parameters.

Figure 10:
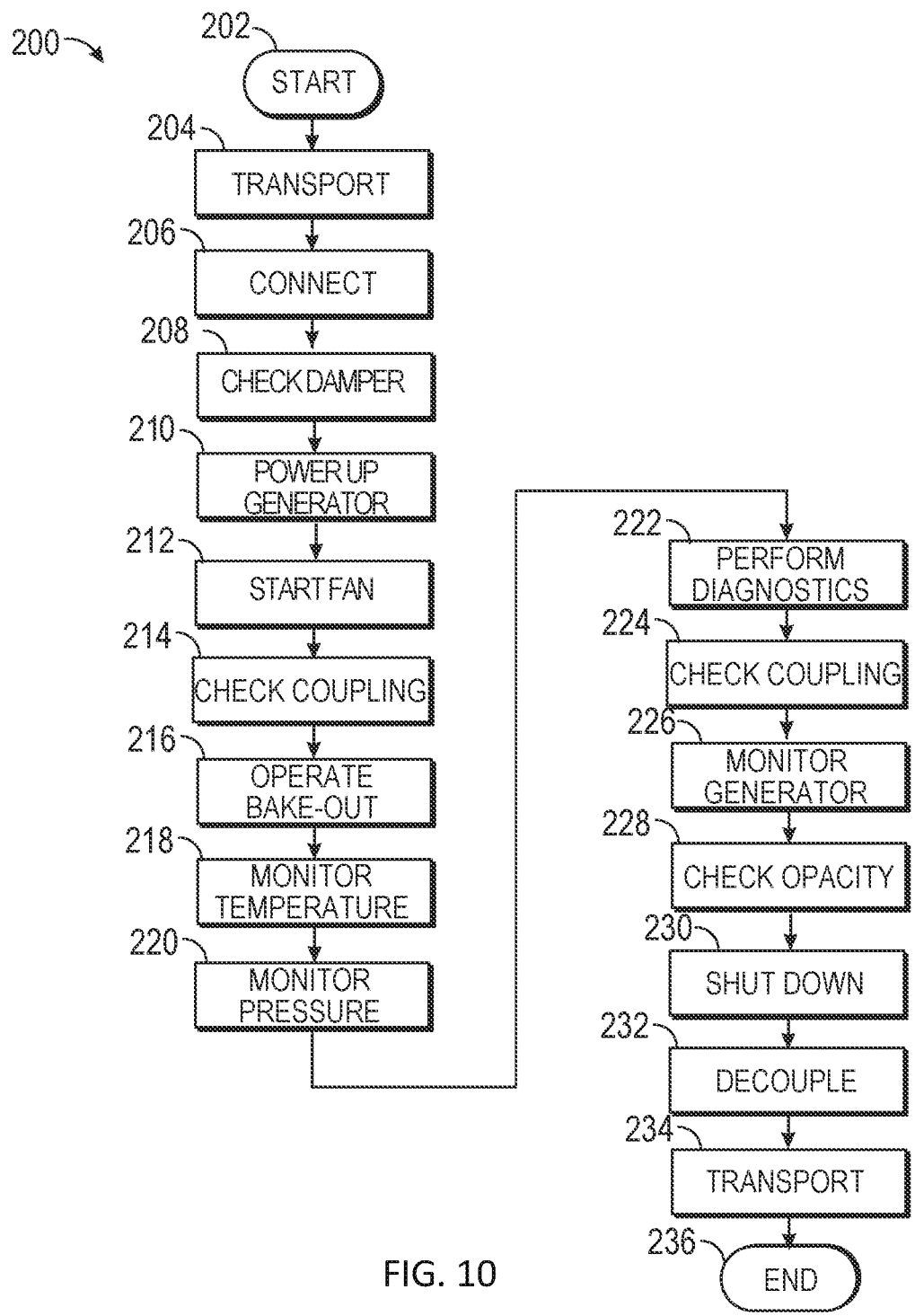
FIG. 10 is a flow chart of a method of employing a mobile treatment system, in accordance with various embodiments.

Referring additionally to FIG. 10, illustrated in flow chart form is a process 200 for employing the treatment assembly 20, at least some steps of which may be carried out by the controller 102. The process 200 begins 202 when a need for treatment of an exhaust flow stream is needed, for example by the processing facility 82 when a bake-out of the RTO 84 is scheduled. The mobile treatment assembly 20 is dispatched and transported 204 to the site where the need has arisen. The treatment assembly 20 is connected 206 to the processing facility 82, such as by connecting the inlet 38 with the conduit 94. The releasable coupling 95 is secured such as through the use of screws, bolts, clamps, or other fasteners and/or a tapered slip fit engagement may be used. Following connection, mechanical operation of the fresh air damper 48 is checked 208 to ensure its free movement. The generator system 32 is powered up 210, such as through the operator interface 108. In a number of embodiments, the fresh air damper 48 may be checked 208 after the generator system 32 is powered up, such as by cycling using the operator interface 108.

Continuing the process 200, the fan 56 is started 212 by initiating operation of the motor 60, such as through the operator interface 108. The controller 102 cycles through a ramp-up sequence of the variable frequency drive motor 60. The ramp-up sequence may include diagnostics, such as according to programs stored in the data storage device 114 to monitor operation of the motor 60 and report any faults, such as through the operator interface 108. In a number of embodiments, the motor 60 is operated by a separate motor controller (not shown) that may interface with the controller 102. The variable frequency drive may be used to smoothly ramp up and control the speed of the motor 60 and the fan 56. With the fan 56 operating, the coupling 95 between the treatment assembly 20 and the processing facility 82 is checked 214 for integrity.

With the fan 56 operating and the desired flow initiated through the treatment house 28, the processing facility 82 is operated 216 in the status for which the treatment assembly 20 has been employed. For example in the current embodiment, the RTO 84 is operated 216 in a bake-out cycle, which may be initiated at this step. The processor 110 monitors 218 the temperature sensor(s) 121 and maintains temperatures below a determined maximum temperature of the filter media 29 by cycling the actuator 50 of the fresh air damper 48 as needed. In addition, the operator may check temperatures via the operator interface 108. The processor 110 may be programmed to issue an alarm if a threshold temperature is exceeded, or to take other actions. The processor 110 also monitors 220 flow through the treatment house using inputs from the pressure sensor(s) 122. The processor 110 may also be programmed to issue an alarm if flow falls below a minimum level, or to take other actions. The operator may also monitor flow status via the operator interface 108. The controller 102 performs 222 a diagnostic check on the temperature sensor(s) 121 and may be programmed to do so at designated time intervals. If any fault is identified by performing 222 the diagnostic, the processor 110 may issue an alarm, or to take other actions.

With the RTO 84 operating in the bake-out mode, the coupling 95 is again checked 224 for integrity. This may be done manually, or may be automated such as by the use of thermal monitoring and/or vision system monitoring. If the coupling 95 is in need of adjustment, the bake-out cycle of the RTO 84 may be suspended for addressing the matter. In the process 200, the controller 102 monitors 226 operation of the generator system 32, which may include performing diagnostics to evaluate parameters of the diesel engine and generator. If any fault is identified in the monitoring 226, the processor 110 may issue an alarm or to take other actions. The operator may also monitor the generator system 32 through the operator interface 108.

With the treatment assembly 20 running and verified, the process 200 continues with a determination 228 of the effectiveness of the treatment assembly 20. For example, measurements or observations may be made at the stream of treated exhaust 80 leaving the treatment assembly 20. The determination 228 may be automated and performed by the processor 110 with the input of appropriate sensors 123 for monitoring a target constituent level of the treated exhaust 80. In the current embodiment, the treated exhaust 80 is manually checked for opacity by an individual with a trained eye for detecting opacity levels where the target constituent is particulate. If the determination 228 finds that the treated exhaust 80 exceeds the target constituent level, operation of the RTO 84 in the bake-out mode may be suspended to investigate the cause and when corrected, the process 200 may be reinitiated.

The operating time of the treatment assembly 20 varies. In uses where the processing facility 82 needs ongoing treatment of the input stream 76 the operating may be indefinite. In an embodiment of treating the by-products of a bake-out of the RTO 84, the operating term may be less than one day with the total time needed varying depending on the time that has elapsed since the previous bake-out, the efficiency of the processing facility 82, and other factors. When the objective of the treatment assembly 20 is accomplished, it is shut-down 230, and a cooling period is allowed to run. When cool, the treatment assembly 20 is disconnected 232 by releasing the coupling 95, the unit is secured, and transported 234 to a new location and the process 200 ends 236.

Through the foregoing embodiments, systems and methods provide for intermittent exhaust stream treatment through a mobile treatment system that may be deployed as needed. When an existing process is scheduled for an operation for which additional treatment is desirable, the mobile treatment system may be dispatched, transported to the site and connected to the existing process. When the process returns to its routine operation and/or when the mobile treatment system is no longer needed, it may be disconnected and deployed elsewhere. The mobile treatment assembly obviates the need for dedicated treatment systems at locations that only have an intermittent need or at which an unanticipated need arises.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A system comprising:
a treatment assembly including an inlet; and
a coupling configured to releasably couple the inlet with an outlet of a stationary processing facility that is configured to produce an exhaust stream,
wherein the stationary processing facility comprises a source of the exhaust stream and a stack configured to expel the exhaust stream to atmosphere through an opening,
wherein the treatment assembly includes a fan coupled with a motor,
wherein the treatment assembly is configured to:
couple with the stack at the coupling;
receive the exhaust stream in an input stream;
draw the exhaust stream through the treatment assembly;
treat at least one constituent of the input stream;
produce a treated exhaust;
decouple from the stationary processing facility; and
be transported to various locations,
wherein the fan and the motor are configured to generate a negative pressure in the treatment assembly sufficient to draw the exhaust stream through the treatment assembly and to prevent the exhaust stream from exiting the opening.

2. The system of claim 1, wherein the treatment assembly is disposed on a vehicle with wheels.

3. The system of claim 1, wherein the treatment assembly includes a treatment house, wherein the fan induces the input stream to flow through the treatment house.

4. The system of claim 3, wherein the treatment assembly includes a fresh air damper disposed between the inlet and the treatment house, wherein the fresh air damper is configured to admit ambient air into the treatment house.

5. The system of claim 4, wherein the treatment assembly includes a generator configured to power the fan.

6. The system of claim 5, wherein the treatment assembly includes a controller configured to:
monitor a temperature in the treatment house; and
maintain the temperature at a level below a maximum temperature by operating the fresh air damper.

7. The system of claim 1, wherein the treatment assembly comprises:
a treatment house disposed between the inlet and the fan;
a control system configured to operate the treatment assembly; and
a generator coupled with the motor and the control system,
wherein the treatment assembly is self-powered by the generator.

8. The system of claim 7, comprising an operator interface, wherein the control system includes at least one controller configured to:
monitor operation of the motor;
monitor operation of the generator; and
display any faults in the monitored operations through the operator interface.

9. The system of claim 1, comprising a monitor configured to measure the opacity of the treated exhaust; and a controller configured to suspend operation of the stationary processing facility when the opacity exceeds a target level.

10. The system of claim 1, wherein the treatment assembly includes at least one pressure sensor and includes at least one controller configured to:
receive an input from the at least one pressure sensor; and
determine, from the input, a flow through the treatment assembly.

11. A method comprising:
assembling a treatment assembly including an inlet;
releasably coupling the inlet with an outlet of a stationary processing facility that is configured to produce an exhaust stream, wherein the stationary processing facility comprises a source of the exhaust stream and a stack configured to expel the exhaust stream to atmosphere through an opening;
effecting the releasable coupling of the treatment assembly with the stack at a coupling;
receiving, into the treatment assembly, the exhaust stream in an input stream;
drawing the exhaust stream through the treatment assembly by a fan coupled with a motor;
treating, by the treatment assembly, at least one constituent of the input stream;
generating, by the fan and the motor, a negative pressure in the treatment assembly;
drawing, by the negative pressure, the exhaust stream through the treatment assembly;
preventing, by the negative pressure, the exhaust stream from exiting the opening;
producing, from the treatment assembly, a treated exhaust;
decoupling the treatment assembly from the stationary processing facility; and
transporting the treatment assembly to various locations.

12. The method of claim 11, comprising containing the treatment assembly on a vehicle with wheels.

13. The method of claim 11, comprising inducing, by the fan, the input stream to flow through a treatment house.

14. The method of claim 13, comprising admitting, by a fresh air damper disposed between the inlet and the treatment house, ambient air into the treatment house.

15. The method of claim 14, comprising powering the fan by a generator in the treatment assembly.

16. The method of claim 15, comprising:
monitoring, by a controller in the treatment assembly, a temperature in the treatment house; and
maintaining, by the controller, the temperature at a level below a maximum temperature by operating the fresh air damper.

17. The method of claim 11, comprising: wherein assembling the treatment assembly comprises providing a treatment house for the treatment assembly between the inlet and the fan; and wherein the method further comprises:
inducing, by the fan, the flow of the input stream;
operating, by a control system, the treatment assembly;
coupling a generator in the treatment assembly with the motor and with the control system; and
self-powering the treatment assembly by the generator.

18. The method of claim 17, comprising:
monitoring, by at least one controller, operation of the motor and of the generator; and
displaying faults in the monitored operation through an operator interface.

19. The method of claim 11, comprising:
receiving input by a controller from at least one pressure sensor; and
determining, by the controller using the input, a flow rate through the treatment assembly.

20. A system, comprising:
a stationary processing facility through which an exhaust stream passes including an emission control system configured to operate in an emission control mode and in a bake-out mode in which a temperature in the emission control system is raised to a point that incinerates accumulated materials;
a vehicle;
a treatment house disposed on the vehicle;
an inlet connected with the treatment house and configured to releasable couple with the stationary processing facility; and
a fan disposed on the vehicle and configured to induce the exhaust stream to flow through the inlet as an inlet stream exiting the emission control system directed into and through the treatment house,
wherein the treatment house is configured to treat at least one constituent of the inlet stream and produce a treated exhaust discharged from the fan through an outlet,
wherein the vehicle with the treatment house and the fan is configured for transport to, and operation at, various locations, and
wherein the fan is configured to generate a negative pressure sufficient to draw the exhaust stream through the treatment house and to prevent the exhaust stream from exiting the stack except through the treatment house,
a monitor to measure the opacity of the treated exhaust discharged from the fan; and
a controller configured to suspend the bake-out mode when the opacity exceeds a target level.

* * * * *